United States Patent
Kobashi

(10) Patent No.: US 11,656,501 B2
(45) Date of Patent: May 23, 2023

(54) DISPLAY DEVICE

(71) Applicant: Japan Display Inc., Tokyo (JP)

(72) Inventor: Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/519,812

(22) Filed: Nov. 5, 2021

(65) Prior Publication Data

US 2022/0146887 A1 May 12, 2022

(30) Foreign Application Priority Data

Nov. 9, 2020 (JP) .............................. JP2020-186857

(51) Int. Cl.
*G02F 1/1335* (2006.01)
*G02F 1/1334* (2006.01)

(52) U.S. Cl.
CPC ...... *G02F 1/133622* (2021.01); *G02F 1/1334* (2013.01)

(58) Field of Classification Search
CPC .......................... G02F 1/133622; G02F 1/1334
See application file for complete search history.

(56) References Cited

U.S. PATENT DOCUMENTS

2019/0197968 A1\* 6/2019 Nakamura ............ G02F 1/1334

FOREIGN PATENT DOCUMENTS

| JP | 2015038544 A | * | 2/2015 |
| JP | 2015038544 A | | 2/2015 |

\* cited by examiner

*Primary Examiner* — Nathanael R Briggs
(74) *Attorney, Agent, or Firm* — K&L Gates LLP

(57) ABSTRACT

A display device includes a display panel and a light source device. A display period of a frame image includes three subframe periods and an adjusting subframe period. The light source device emits light for reproducing a color corresponding to first chromaticity coordinates in a first subframe period, emits light for reproducing a color corresponding to second chromaticity coordinates in a second subframe period, emits light for reproducing a color corresponding to third chromaticity coordinates in a third subframe period, and emits light for reproducing a differential color in the adjusting subframe period. A chromaticity coordinate area with the first to third chromaticity coordinates as apexes includes chromaticity coordinates of pixel data obtained by excluding partial pixel data from pixel data included in frame image data. The differential color is a complementary color of a mixed color of three colors corresponding to the first to third chromaticity coordinates.

11 Claims, 9 Drawing Sheets

DISPLAY DEVICE

CROSS-REFERENCE TO RELATED APPLICATION

This application claims the benefit of priority from Japanese Patent Application No. 2020-186857 filed on Nov. 9, 2020, the entire contents of which are incorporated herein by reference.

BACKGROUND

1. Technical Field

What is disclosed herein relates to a display device.

2. Description of the Related Art

A liquid crystal display device has been known that performs display output by what is called a field sequential color (FSC) system, which controls pixels so as to pass light in a plurality of colors through the same pixel at different timings (Japanese Patent Application Laid-open Publication No. 2015-038544, for example).

In the FSC system, a plurality of subframe periods for outputting different colors during a display period of a frame image are provided, which may cause what is called color break when a color greatly changes before and after the switching of the subframe periods. The color break is a phenomenon causing a user of the display device to visually recognize a monochromatic image that is output in each of the subframe periods.

For the foregoing reasons, there is a need for a display device that can further inhibit color break.

SUMMARY

According to an aspect, a display device includes: a display panel including two substrates facing each other with a liquid crystal enclosed therebetween and two electrodes to which a potential difference controlling orientation of the liquid crystal is given, the display panel being provided with a plurality of pixels; and a light source device configured to emit light to the display panel. The light source device includes a first light source configured to emit light in a first color, a second light source configured to emit light in a second color, and a third light source configured to emit light in a third color. A display period of a frame image includes three subframe periods and an adjusting subframe period for adjusting a color reproduced in the three subframe periods. The three subframe periods includes a first subframe period, a second subframe period, and a third subframe period. The light source device is configured to emit light for reproducing a color corresponding to first chromaticity coordinates in the first subframe period, emit light for reproducing a color corresponding to second chromaticity coordinates in the second subframe period, emit light for reproducing a color corresponding to third chromaticity coordinates in the third subframe period, and emit light for reproducing a differential color in the adjusting subframe period. A triangular chromaticity coordinate area with the first chromaticity coordinates, the second chromaticity coordinates, and the third chromaticity coordinates as apexes includes chromaticity coordinates of pixel data obtained by excluding partial pixel data having a relatively low gradation value from a plurality of pieces of pixel data included in frame image data. The triangular chromaticity coordinate area is part of a color gamut with chromaticity coordinates of the first color, chromaticity coordinates of the second color, and chromaticity coordinates of the third color as apexes. The differential color is a complementary color of a mixed color of the color corresponding to the first chromaticity coordinates, the color corresponding to the second chromaticity coordinates, and the color corresponding to the third chromaticity coordinates.

DETAILED DESCRIPTION

The following describes embodiments of the present disclosure with reference to the accompanying drawings. The disclosure is only by way of example, and some appropriate modifications with the gist of the invention maintained that can easily be thought of by those skilled in the art are naturally included in the scope of the present disclosure. The drawings may illustrate more schematically the width, thickness, shape, and the like of parts than those of actual aspects in order to make the description clearer; they are only by way of example and do not limit the interpretation of the present disclosure. In the present specification and drawings, components similar to those previously described with reference to the drawings previously described are denoted by the same reference sings, and detailed descriptions thereof may be omitted as appropriate.

In this disclosure, when an element is described as being "on" another element, the element can be directly on the other element, or there can be one or more elements between the element and the other element.

First Embodiment

Figure 1:
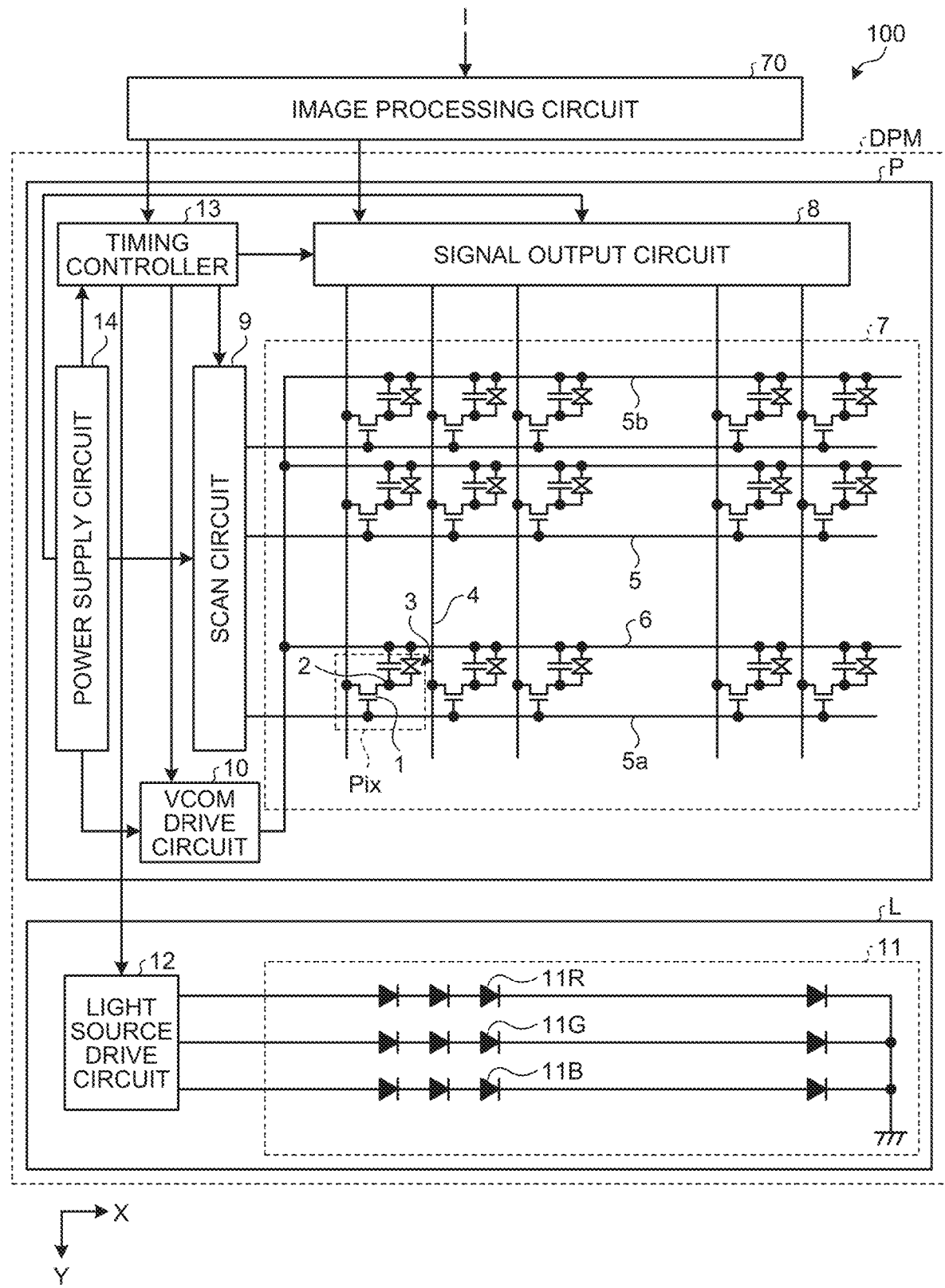
FIG. 1 is a schematic circuit diagram of a main configuration of a display device.

FIG. 1 is a schematic circuit diagram of a main configuration of a display device 100. The display device 100 includes a display panel module DPM and an image processing circuit 70. The display panel module DPM includes a display panel P and a light source device L.

The display panel P includes a display area 7, a signal output circuit 8, a scan circuit 9, a VCOM drive circuit 10, a timing controller 13, and a power supply circuit 14. In the following, one surface of the display panel P corresponding to the display area 7 is defined as a display surface, whereas the other surface is defined as a back surface. A lateral side of the display device 100 is positioned in a direction crossing (orthogonal to, for example) a facing direction in which the display surface and the back surface face each other with respect to the display device 100.

Figure 2:
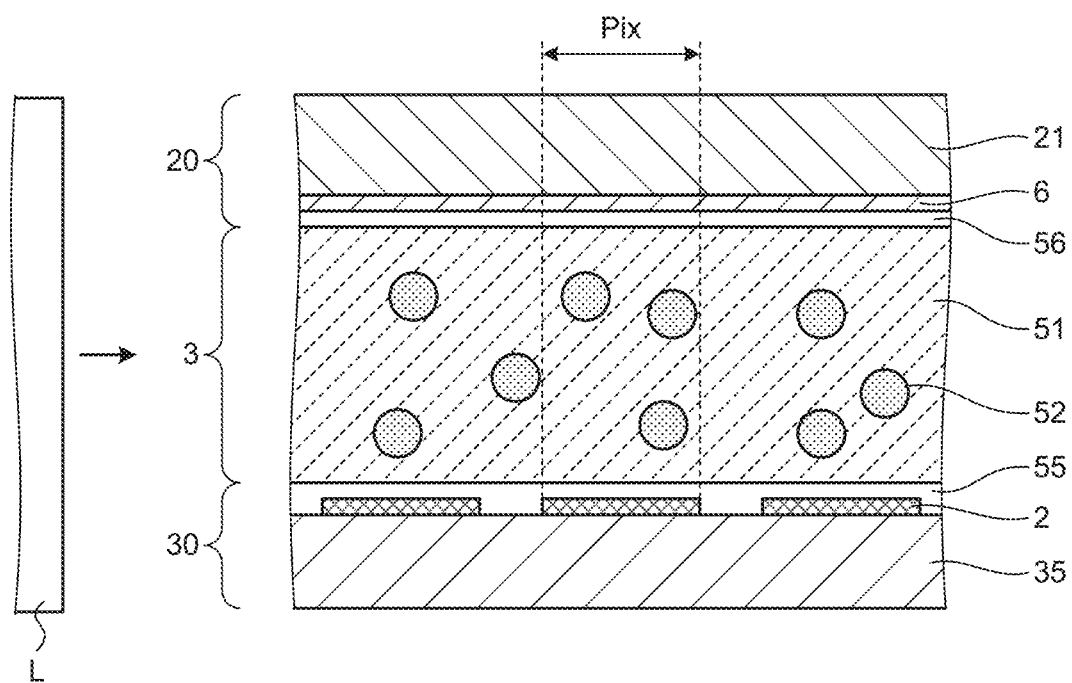
FIG. 2 is a schematic sectional view of a display panel.

In the display area 7, a plurality of pixels Pix are arranged in a matrix (row-column configuration). A pixel Pix includes a switching element 1 and two electrodes. FIG. 1 and FIG. 2 described later illustrate a pixel electrode 2 and a common electrode 6 as the two electrodes.

FIG. 2 is a schematic sectional view of the display panel P. The display panel P has two substrates facing each other and a liquid crystal 3 enclosed between the two substrates. In the following, one of the two substrates is defined as a first substrate 30, whereas the other is defined as a second substrate 20.

The first substrate 30 includes a light-transmitting glass substrate 35, pixel electrodes 2 stacked on the second substrate 20 side of the glass substrate 35, and an insulating layer 55 staked on the second substrate 20 side of the glass substrate 35 so as to cover the pixel electrodes 2. The pixel electrode 2 is provided individually for each of the pixels Pix. The second substrate 20 includes a light-transmitting glass substrate 21, the common electrode 6 stacked on the first substrate 30 side of the glass substrate 21, and an insulating layer 56 stacked on the first substrate 30 side of the glass substrate 21 so as to cover the common electrode 6. The common electrode 6 has a plate shape or a film shape shared by the pixels Pix.

The liquid crystal 3 of the first embodiment is a polymer-dispersed type liquid crystal. Specifically, the liquid crystal 3 includes a bulk 51 and fine particles 52. The fine particles 52 change their orientation in accordance with a potential difference between the pixel electrodes 2 and the common electrode 6 within the bulk 51. The potential of the pixel electrode 2 is controlled for the each of the pixels Pix, whereby the degree of at least either light transmission or scattering is controlled for each of the pixels Pix.

In the first embodiment described with reference to FIG. 2, the pixel electrodes 2 and the common electrode 6 face each other with the liquid crystal 3 therebetween. The display panel P may have a configuration in which the pixel electrodes 2 and the common electrode 6 are provided on one substrate and the orientation of the liquid crystal 3 is controlled by an electric fired generated by the pixel electrodes 2 and the common electrode 6.

The following describes a mechanism of controlling the potential of the pixel electrodes 2 and the common electrode 6. As illustrated in FIG. 1, the switching element 1 is a switching element using a semiconductor such as a thin film transistor (TFT). One of a source and a drain of the switching element 1 is coupled to one of the two electrodes, or the pixel electrodes 2. The other of the source and the drain of the switching element 1 is coupled to a signal line 4. A gate of the switching element 1 is coupled to a scan line 5. The scan line 5 gives a potential for coupling the source and the drain of the switching element 1 and decoupling the source from the drain, under the control of the scan circuit 9. The control of the potential is performed by the scan circuit 9.

In the example illustrated in FIG. 1, a plurality of the signal lines 4 are arranged along one of an arrangement direction of the pixels Pix, or a row direction. The signal lines 4 extend along the other of the arrangement direction of the pixels Pix, or a column direction. Each of the signal lines 4 is shared by switching elements 1 of the pixels Pix arranged along the column direction. A plurality of the scan lines 5 are arranged along the column direction. The scan lines 5 extend along the row direction. Each of the scan lines 5 is shared by the switching elements 1 of the pixels Pix arranged in the row direction.

In the description of the first embodiment, the extending direction of the scan lines 5 is defined as an X direction, whereas a direction in which the scan lines 5 are arranged is defined as a Y direction. In FIG. 1, one of the scan lines 5 placed at both ends in the Y direction is defined as a scan line 5a, whereas the other is defined as a scan line 5b.

The common electrode 6 is coupled to the VCOM drive circuit 10. The VCOM drive circuit 10 gives a potential functioning as a common potential to the common electrode 6. At timing when the scan circuit 9 gives a potential functioning as a drive signal to the scan line 5, the signal output circuit 8 outputs a pixel signal, which will be described later, to each of the signal lines 4, whereby the liquid crystal (the fine particles 52) serving as storage capacitor and a capacitive load formed between the pixel electrode 2 and the common electrode 6 is charged. Thus, the voltage between the pixel electrode 2 of the pixel Pix and the common electrode 6 becomes a voltage corresponding to the pixel signal. After the supply of the drive signal has been stopped, the liquid crystal (the fine particles 52) as the storage capacitor and the capacitive load maintains the pixel signal. The degree of scattering of the liquid crystal (the fine particles 52) is controlled in accordance with the voltage of each of the pixel electrodes 2 of the pixels Pix and the voltage of the common electrode 6. The liquid crystal 3 may be formed of, for example, a polymer-dispersed type liquid crystal having a larger degree of scattering as a voltage between the pixel electrode 2 of the pixel Pix and the common electrode 6 increases or a polymer-dispersed type liquid crystal having a larger degree of scattering as the voltage between the pixel electrode 2 of the pixel Pix and the common electrode 6 decreases.

As illustrated in FIG. 2, the light source device L is placed on a lateral side of the display panel P. The light source device L includes a light source 11 and a light source drive circuit 12. The light source 11 includes a first light source 11R that emits red (R) light, a second light source 11G that emits green (G) light, and a third light source 11B that emits blue (B) light. The first light source 11R, the second light source 11G, and the third light source 11B each emit light under the control of the light source drive circuit 12. Each of the first light source 11R, the second light source 11G, and the third light source 11B of the first embodiment is a light source using a light emitting element such as a light emitting diode (LED) but is not limited thereto and is only required to be a light source the light emission timing of which can be controlled. The light source drive circuit 12 controls the light emission timing of the first light source 11R, the second light source 11G, and the third light source 11B under the control of the timing controller 13. In the first embodiment, red (R) is a first primary color. In the first embodiment, green (G) is a second primary color. In the first embodiment, blue (B) is a third primary color. In each of subframe periods SF and an adjusting subframe period Ad, which will be described later, each of the first light source 11R, the second light source 11G, and the third light source 11B can independently emit light, and two or three of the first light source 11R, the second light source 11G, and the third light source 11B can simultaneously emit light.

When light is emitted from the light source 11, the display area 7 is illuminated by the light incident from one side thereof in the Y direction. Each of the pixels Pix passes or scatters the light incident from the one side in the Y direction. The degree of scattering depends on the state of the liquid crystal 3 controlled in accordance with the pixel signal.

The timing controller 13 is a circuit controlling the operation timing of the signal output circuit 8, the scan circuit 9, the VCOM drive circuit 10, and the light source drive circuit 12. In the first embodiment, the timing controller 13 operates based on a signal input via the image processing circuit 70.

The image processing circuit 70 outputs, to the signal output circuit 8 and the timing controller 13, a signal based on frame image data I (refer to FIG. 1) received from the outside of the display device 100. When data indicating RGB gradation values assigned to one pixel Pix is defined as pixel data, the frame image data I, which is input to the image processing circuit 70 in order to output a frame image, is a set of a plurality of pieces of pixel data for the respective pixels Pix provided in the display area 7. The image processing circuit 70 may be provided on one substrate included in the display panel P, be mounted on a flexible printed board on which wiring and the like extending from the display panel P are provided, or be provided outside the display panel P.

Figure 3:
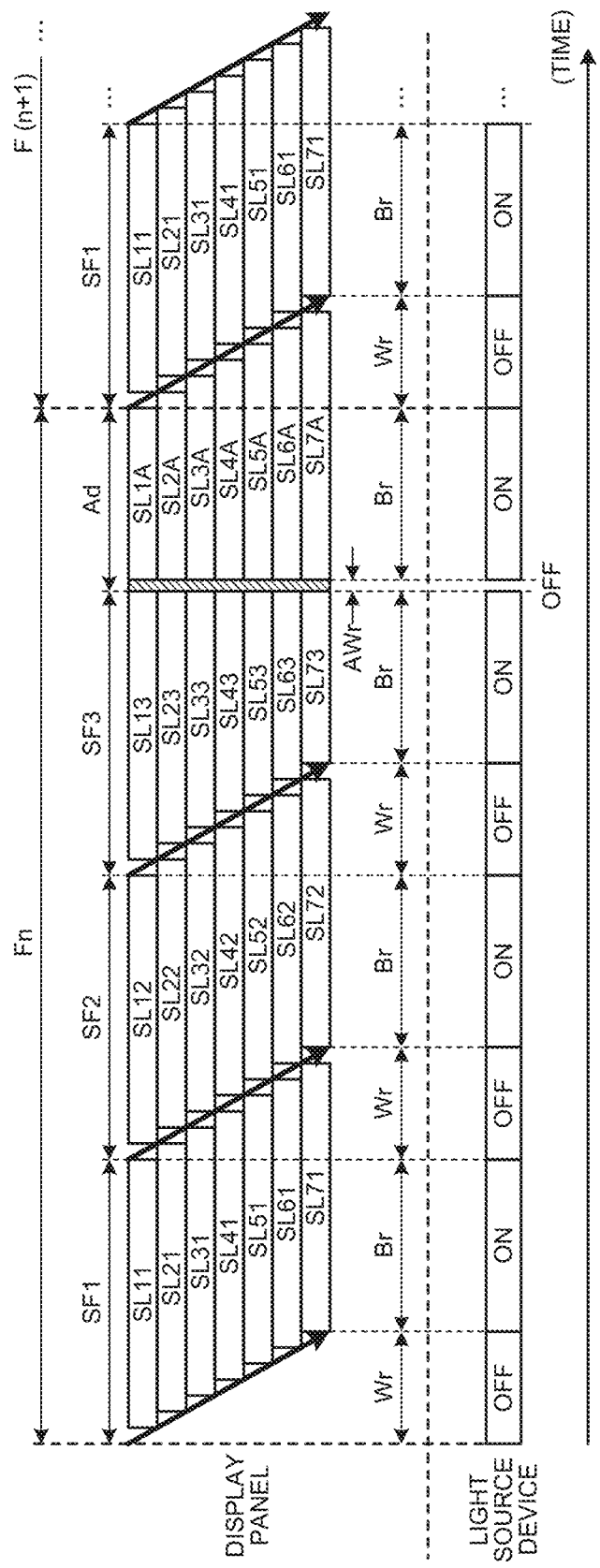
FIG. 3 is a time chart illustrating an example of control used in the display device.

FIG. 3 is a time chart illustrating an example of control used in the display device 100. As exemplified in FIG. 3, the first embodiment employs a field sequential color (FSC) system in which frame periods F such as frame period Fn and F(n+1) each include a first subframe period SF1, a second subframe period SF2, and a third subframe period SF3 and light in different colors are emitted in lighting periods Br of the first subframe period SF1, the second subframe period SF2, and the third subframe period SF3, respectively. In the following, the frame periods such as the frame periods Fn, F(n+1), . . . are collectively referred to as a frame period F when they are not distinguished from each other. The frame periods Fn, F(n+1), . . . are each a period during which one frame image is displayed. The frame period F(n+1) is a frame period subsequent to the frame period Fn. n is a natural number. The first subframe period SF1, the second subframe period SF2, and the third subframe period SF3 are collectively referred to as a subframe period SF described when they are not distinguished from each other.

In the first embodiment, the pixel signal corresponding to the lighting period Br is written in each of the subframe periods SF and the adjusting subframe period Ad, which will be described later, included in the frame period F. Writing of the pixel signal during the subframe period SF is performed in a writing period Wr. Writing of the pixel signal during the adjusting subframe period Ad is performed in a writing period AWr.

Assume that color components to be reproduced by a signal to be given to one pixel Pix in the frame period Fn is (R, G, B)=(r0, g0, b0) when represented by RGB gradation values. r0 is a gradation value of red (R) in the frame image data I including information indicating RGB gradation values and functions as a red (R) component of an image displayed in the display area 7. g0 is a gradation value of green (G) in the frame image data I including the information indicating RGB gradation values and functions as a green (G) component of the image displayed in the display area 7. b0 is a gradation value of blue (B) in the frame image data I including the information indicating RGB gradation values and functions as a blue (B) component of the image displayed in the display area 7.

Now, r0 can be divided into three components like r0=r1+r2+r3; g0 can be divided into three components like g0=g1+g2+g3; and b0 can be divided into three components like b0=b1+b2+b3. Consequently, in the one pixels Pix, color reproduction corresponding to (R, G, B)=(r1, g1, b1) is performed in the first subframe period SF1. In the one pixel Pix, color reproduction corresponding to (R, G, B)=(r(m-k), g(m-k), b(m-k)) is performed in a subframe period SF(m-k). k is an integer less than m. When m=3 as in the embodiment, for example, a case where k=2, a case where k=1, and a case where k=0 are successively provided. The first subframe period SF1 described above corresponds to the case where k=2. In the one pixel Pix, color reproduction corresponding to (R, G, B)=(rm, gm, bm) is performed in a subframe period SFm. Thus, in the one pixel Pix, color reproduction corresponding to color components similar to (R, G, B)=(r0, g0, b0) can be performed during the frame period Fn.

When m=3 as in the embodiment, (R, G, B)=(r0, g0, b0) can be divided into (R, G, B)=(r1, g1, b1) to be given in the first subframe period SF1, (R, G, B)=(r2, g2, b2) to be given in the second subframe period SF2, and (R, G, B)=(r3, g3, b3) to be given in the third subframe period SF3.

As an example, assume that (R, G, B)=(r0, g0, b0)=(35, 40, 30). Light in white (W) can be reproduced by mixing red (R), green (G), and blue (B) together by additive color mixing. Among the color components of (R, G, B)=(r0, g0, b0)=(35, 40, 30) described above, color components that can be extracted as white are (R, G, B)=(30, 30, 30). Thus, by writing the pixel signal of (R, G, B)=(r2, g2, b2)=(30, 30, 30) in the writing period Wr of the second subframe period SF2, for example, the pixel signal corresponding to the color components that can be extracted as white can be given during the second subframe period SF2. The pixel to which such a pixel signal has been given is irradiated with white (W) light during the lighting period Br of the second subframe period SF2 subsequent to the writing period Wr of the second subframe period SF2, whereby white (W) display output can be performed. Specifically, by lighting the first light source 11R, the second light source 11G, and the third light source 11B, the light source device L can emit white (W) light. By giving the pixel signal corresponding to a gradation value of "30" to the pixel Pix, and emitting white (W) light, it is possible to reproduce a state obtained when the pixel signal corresponding to (R, G, B)=(r2, g2, b2)=(30, 30, 30) are given.

Color components obtained by removing the color components that can be extracted as white from the color component (R, G, B)=(r0, g0, b0)=(35, 40, 30) described above, are (R, G, B)=(5, 10, 0). For example, by writing the pixel signal of (R, G, B)=(r1, g1, b1)=(5, 0, 0) in the writing period Wr of the first subframe period SF1, the pixel signal corresponding to a red (R) color component can be given during the first subframe period SF1. By emitting red (R) light for the pixel Pix given such a pixel signal toward the display panel P during the lighting period Br of the first subframe period SF1 subsequent to the writing period Wr of the first subframe period SF1, red (R) display output can be performed. Specifically, by lighting the first light source 11R, the light source device L can emit red (R) light. By giving the pixel signal corresponding to a gradation value of "5" to the pixel Pix, and emitting red (R) light, it is possible to reproduce a state obtained when the pixel signal corresponding to (R, G, B)=(r1, g1, b1)=(5, 0, 0) are given. By writing the pixel signal of (R, G, B)=(r3, g3, b3)=(0, 10, 0) in the writing period Wr of the third subframe period SF3, the pixel signal corresponding to a green (G) color component can be given during the third subframe period SF3. By emitting green (G) light for the pixel Pix given such a pixel signal toward the display panel P during the lighting period Br of the third subframe period SF3 subsequent to the writing period Wr of the third subframe period SF3, green (G) display output can be performed. Specifically, by lighting the second light source 11G, the light source device L can emit green (G) light. By giving the pixel signal corresponding to a gradation value of "10" to the pixel Pix, and emitting green (G) light, it is possible to reproduce a state obtained when the pixel signal corresponding to (R, G, B)=(r3, g3, b3)=(0, 10, 0) are given. Thus, in this example, output corresponding to the color components of (R, G, B)=(r0, g0, b0)=(35, 40, 30) is performed in the frame period F. This example only describes an example of the signal to be given to one pixel Pix, and color reproduction corresponding to blue (B) or a mixed color other than white (W) may be required depending on the respective values of r0, g0, and b0. The mixed color in this example refers to a color containing two or more color components among the three colors of red (R), green (G), and blue (B). A color corresponding to each of first chromaticity coordinates V1, second chromaticity coordinates V2, and third chromaticity coordinates V3, which will be described later (refer to FIG. 5), corresponds to the mixed color.

Thus, each of the signals given to the respective pixels Pix in the frame period F is divided into m signals, which are respectively given to the subframe periods SF, and light corresponding to the given pixel signal is applied from the light source device L to the display panel P, whereby the display panel P can perform display output corresponding to an input image.

During the writing period Wr of each of the subframe periods SF, signal control is performed to turn on TFTs provided in the pixels Pix by outputting the drive signal to the scan line 5 from the scan circuit 9 and to write the pixel signals to the pixels Pix by outputting the pixel signals to the signal lines 4 from the signal output circuit 8. Consequently, the pixel signals for the pixels Pix included in a pixel row that are coupled to a common scan line 5 and that are simultaneously turned on in accordance with the drive signal supplied to the scan line 5, are written at the same time. Thus, when an image written to the pixel row coupled to the common scan line 5 is defined as a line image, then the frame image is composed of a plurality of line images arranged along the arrangement direction of the scan lines 5. The line image is an image that is displayed by the pixels Pix arranged along the extending direction of the scan lines 5 (the arrangement direction of the signal lines 4). In the following, "line" simply refers to the pixel row that outputs the line image, unless otherwise specified.

The time charts in FIG. 3 and FIG. 9, which will be described later, illustrate pixel-signal control related to line images to be output to a display region of seven lines in an exemplified manner. In FIG. 3, for example, during the writing period Wr in each of the subframe periods SF, the drive signal is output from the scan circuit 9 to the scan lines 5 such that the scan lines 5 are sequentially scanned from a scan line 5 positioned on one end side in the Y direction (for example, the scan line 5a illustrated in FIG. 1) toward a scan line 5 position on the other side (for example, the scan line 5b illustrated in FIG. 1). Thus, line images SL11, SL21, SL31, SL41, SL51, SL61, and SL71 are sequentially written to the display region of the seven lines illustrated in FIG. 3 during the writing period Wr of the first subframe period SF1. Line images SL12, SL22, SL32, SL42, SL52, SL62, and SL72 are sequentially written during the writing period Wr of the second subframe period SF2. Line images SL1m, SL2m, SL3m, SL4m, SL5m, SL6m, and SL7m are sequentially written during the writing period Wr of the subframe period SFm. Although not explicitly illustrated, line images SL1(m-k), SL2(m-k), SL3(m-k), SL4(m-k), SL5(m-k), SL6(m-k), and SL7(m-k) are sequentially written during the writing period Wr of the subframe period SF(m-k) prior to the subframe period SFm.

When the relation between the line images described above and (R, G, B)=(r0, g0, b0) according to a series of the above processing is exemplified in accordance with the case of m=3 of the embodiment, the pixel signal of (R, G, B)=(r1, g1, b1) is included in one of the line images SL11, SL21, SL31, SL41, SL51, SL61, and SL71 written during the writing period Wr of the first subframe period SF1. The pixel signal of (R, G, B)=(r2, g2, b2) is included in one of the line images SL12, SL22, SL32, SL42, SL52, SL62, and SL72 written during the writing period Wr of the second subframe period SF2. The pixel signal of (R, G, B)=(r3, g3, b3) is included in one of the line images SL13, SL23, SL33, SL43, SL53, SL63, and SL73 written during the writing period Wr of the third subframe period SF3.

The configuration and control of the seven lines in FIG. 3 and FIG. 9, which will be described later, are only by way of example in order to make the description easy to understand, and the number of lines in the display area 7 is not limited to the seven lines. The number of lines in the display area 7 is only required to be plural and may be six or less or eight or greater.

The light source 11 of the light source device L is not lit during the writing period Wr. In FIG. 3 and FIG. 9, which will be described later, "Off" indicates that the light source 11 is not lit. In FIG. 3 and FIG. 9, which will be described later, "On" indicates that the light source 11 is lit in the lighting periods Br in each of the frame periods F.

Writing of the pixel signals during the writing period Wr of each of the subframe periods SF proceeds line by line. In other words, the writing of the pixel signals corresponding to the frame image that are input as the frame image data I is performed not collectively but line by line. Thus, as illustrated in FIG. 3, for example, during writing of the line image SL12 in the writing period Wr of the second subframe period SF2, the line images SL21, SL31, . . . written in the writing period Wr of the first subframe period SF1 are held. Even when the process proceeds to a writing step of the line image SL22 in the writing period Wr of the second subframe period SF2, the line images SL31, SL41, . . . written in the writing period Wr of the first subframe period SF1 are held. Thus, in writing the pixel signals line by line, each of the pixel signals written in the previous subframe period SF is held line by line until a new pixel signal is written.

Although the pixel signals to be written in the writing period AWr of the adjusting subframe period Ad are written to all the lines collectively, writing of the pixel signals during the writing period Wr of the first subframe period SF1 of the next frame period F subsequent to the adjusting subframe period Ad proceeds line by line. Thus, FIG. 3 illustrates the pixel signals written in the writing period AWr as line images SL1A, SL2A, SL3A, SL4A, SL5A, SL6A, and SL7A line by line. FIG. 3 illustrates that the differences between the remaining periods for the line images SL1A, SL2A, SL3A, SL4A, SL5A, SL6A, and SL7A depend on the differences between the writing timings of the line images SL11, SL21, SL31, SL41, SL51, SL61, and SL71 written during the writing period Wr of the first subframe period SF1 of the next frame period F.

On the other hand, the pixel signals for the adjusting subframe period Ad are written to all the lines collectively. Specifically, in the adjusting subframe period Ad, as illustrated by the writing period AWr in FIG. 3, all the lines are collectively driven. In the writing period AWr, a common pixel signal is written to the pixels Pix sharing the signal line 4. Thus, collective rewriting for all the lines is performed in the adjusting subframe period Ad. During the writing period AWr, the light source 11 of the light source device L is not lit.

The following describes gradation-value control of the pixel signals to be written in the writing period Wr of the subframe period SF and the writing period AWr of the adjusting subframe period Ad and reproduction-color control of the light to be emitted from the light source device L with reference to FIG. 4 to FIG. 11.

Figure 4:
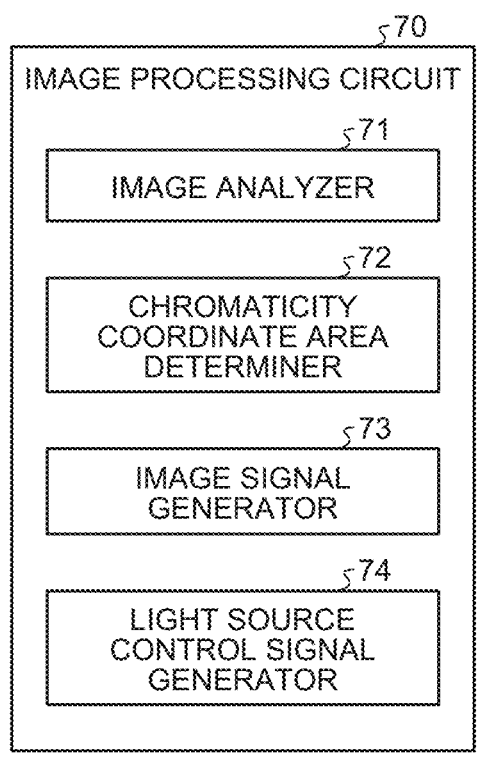
FIG. 4 is a block diagram illustrating a functional configuration example of an image processing circuit.

FIG. 4 is a block diagram illustrating a functional configuration example of the image processing circuit 70. The image processing circuit 70 includes an image analyzer 71, a chromaticity coordinate area determiner 72, an image signal generator 73, and a light source control signal generator 74, for example.

The image analyzer 71 analyzes the frame image data I. Specifically, the image analyzer 71 acquires gradation values indicated by each of a plurality of pieces of pixel data included in the frame image data I to be input to the image processing circuit 70 and determines the coordinates and the distribution of the pieces of pixel data within a color gamut TRGB (refer to FIG. 5).

Figure 5:
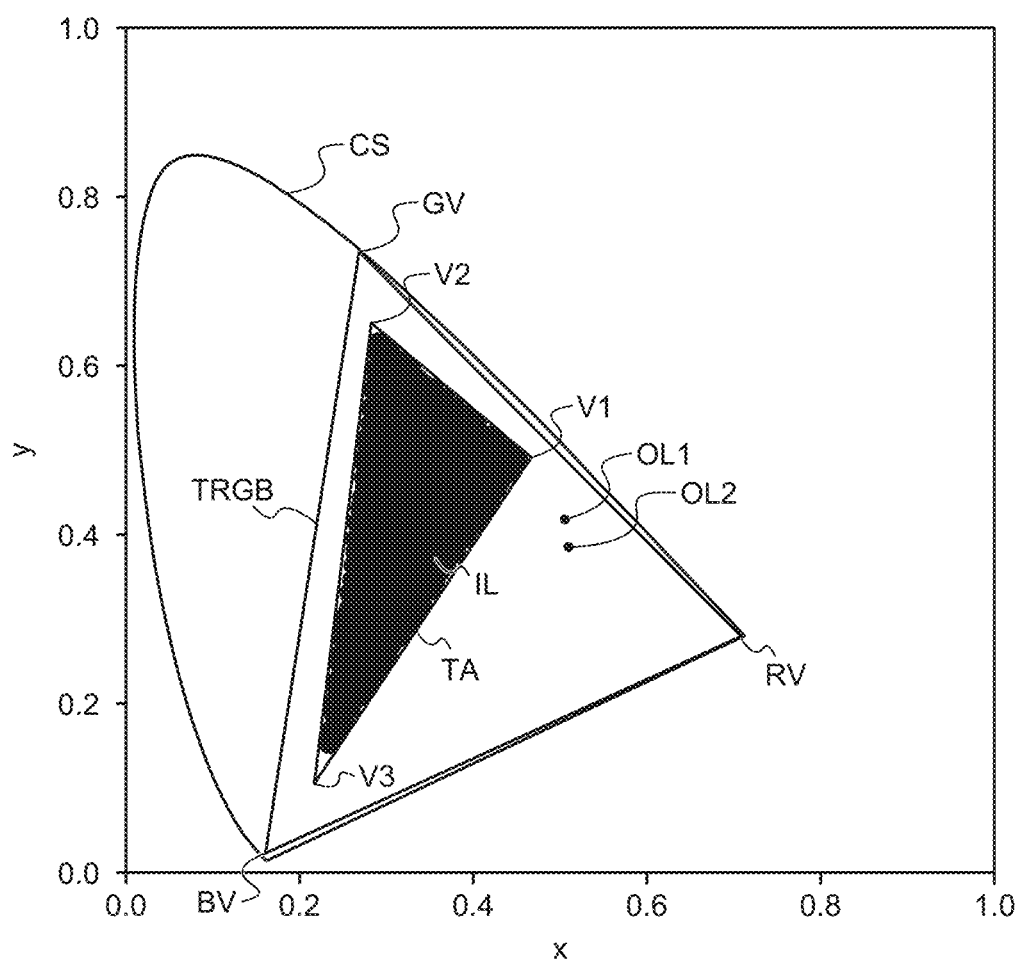
FIG. 5 is a schematic diagram illustrating an example of a relation between a color gamut in the CIE1931 color space and the positions and the distribution of a plurality of pieces of pixel data included in frame image data.

FIG. 5 is a schematic diagram illustrating an example of a relation between the color gamut TRGB in the CIE1931 color space and the positions and the distribution of a plurality of pieces of pixel data included in the frame image data I. CIE indicates Commission internationale de l'eclairage in French. The letter (e) following the comma (') is originally accompanied by an orthographic sign, but the letter is an environment-dependent letter and is thus replaced with an alphabet of e in the present specification. The CIE1931 color space is a color space defined by the Commission internationale de l'eclairage in 1931.

FIG. 5 illustrates a color space CS defined as the CIE1931 color space using an xy chromaticity diagram. FIG. 5 illustrates the color gamut TRGB included in the color space CS. The color gamut TRGB is a color gamut within a triangle with first light chromaticity coordinates RV, second light chromaticity coordinates GV, and third light chromaticity coordinates BV as apexes. The first light chromaticity coordinates RV are coordinates corresponding to the highest gradation value of red (R) reproducible by the display device 100 with light in red (R) with the highest luminance that is emitted by the first light source 11R. The second light chromaticity coordinates GV are coordinates corresponding to the highest gradation value of green (G) reproducible by the display device 100 with light in green (G) with the highest luminance that is emitted by the second light source 11G. The third light chromaticity coordinates BV are coordinates corresponding to the highest gradation value of blue (B) reproducible by the display device 100 with light in blue (B) with the highest luminance that is emitted by the third light source 11B.

For example, when a system is employed in which gradation values, from among which each of r0, g0, and b0 of (R, G, B)=(r0, g0, b0) can be one value, are represented with j bits, the minimum value of each of r0, g0, and b0 is 0, whereas the maximum value thereof is $(2^j-1)$. In this case, gradation values indicated by the first light chromaticity coordinates RV are (R, G, B)=$((2^j-1), 0, 0)$. Gradation values indicated by the second light chromaticity coordinates GV are (R, G, B)=$(0, (2^j-1), 0)$. Gradation values indicated by the third light chromaticity coordinates BV are (R, G, B)=$(0, 0, (2^j-1))$. As an example, when j=8, $(2^j-1)=255$. j is a natural number. The following description will be given based on the system described here in which the gradation value is represented with j bits.

The pieces of pixel data included in the frame image data I include a gradation value of red (R), a gradation value of green (G), and a gradation value of blue (b) like (R, G, B)=(r0, g0, b0). In the xy chromaticity diagram illustrated in FIG. 5, each of the pieces of pixel data corresponds to a pair of coordinates within the color gamut TRGB. The image analyzer 71 determines each pair of coordinates of the pieces of pixel data within the color gamut TRGB. The image analyzer 71 determines the distribution of the pieces of pixel data included in the frame data based on the determined each pair of coordinates of the pieces of pixel data. FIG. 5 illustrates an example in which almost all the coordinates except excluded coordinates OL1 and OL2 among the coordinates of the pieces of pixel data are included within a chromaticity coordinate area TA. In FIG. 5, such a set of almost all the coordinates are schematically illustrated with a black-filled area IL.

Based on the coordinates and the distribution of the pieces of pixel data included in the frame image determined by the image analyzer 71, the chromaticity coordinate area determiner 72 determines the first chromaticity coordinates V1, the second chromaticity coordinates V2, and the third chromaticity coordinates V3 of the frame period F for displaying the frame image.

The first chromaticity coordinates V1, the second chromaticity coordinates V2, and the third chromaticity coordinates V3 are coordinates within the color gamut TRGB. That is to say, the first chromaticity coordinates V1, the second chromaticity coordinates V2, and the third chromaticity coordinates V3 are pairs of coordinates indicating specific colors in the color gamut TRGB illustrated in FIG. 5 and are pairs of coordinates corresponding to colors reproducible by a combination of the light that is emitted from the first light source 11R, the light that is emitted from the second light source 11G, and the light that is emitted from the third light source 11B. The chromaticity coordinate area determiner 72 determines the first chromaticity coordinates V1, the second chromaticity coordinates V2, and the third chromaticity coordinates V3 such that the area IL is included within the triangular chromaticity coordinate area TA with the first chromaticity coordinates V1, the second chromaticity coordinates V2, and the third chromaticity coordinates V3 as apexes.

The excluded coordinates OL1 and OL2 are not necessarily required to be included within the chromaticity coordinate area TA. That is to say, the chromaticity coordinate area TA does not need to include all pieces of pixel data included in the frame image data I. However, pieces of pixel data that are not necessarily required to be included in the chromaticity coordinate area TA like the excluded coordinates OL1 and OL2 among the pieces of pixel data included in the frame image data I satisfy two conditions. One of the two conditions is that the excluded coordinates OL1 and OL2 correspond to partial pixel data having a relatively low gradation value among the pieces of pixel data included in the frame image data I. The "pixel data having a relatively low gradation value" refers to, when representative values of the respective pieces of pixel data are compared with each other, pixel data included within a range of 5% of all the pieces of pixel data counted from the lowest representative value. The representative value is the maximum value of the three gradation values: r0, g0, and b0, which are represented in the form of (R, G, B)=(r0, g0, b0). The other of the two conditions is that the proportion of the pixel data outside the chromaticity coordinate area TA like the excluded coordinates OL1 and OL2 falls within 5% or less of the pieces of pixel data included in the frame image data I. If the two conditions are satisfied, the pieces of pixel data outside the chromaticity coordinate area TA are not limited to two pieces of pixel data like the excluded coordinates OL1 and OL2, and the number of the pieces of pixel data outside the chromaticity coordinate area TA may be one or less or three or greater. This is because the pieces of pixel data having a relatively low representative value are pixel data having relatively low visual influence, and thus even if the pieces of pixel data are not partially reflected on display output, the influence on color reproducibility is relatively low.

The state in which the area IL is included within the triangular chromaticity coordinate area TA means that "a color corresponding to a combination of R, G, B gradation values of the pixel data included in the area IL can be reproduced by a combination of light in the color corresponding to the first chromaticity coordinates V1, light in the color corresponding to the second chromaticity coordinates V2, and light in the color corresponding to the third chromaticity coordinates V3". In other words, in the image processing circuit 70, the image analyzer 71 performs image analysis in order to determine the first chromaticity coordinates V1, the second chromaticity coordinates V2, and the third chromaticity coordinates V3 that can form the area IL, and then the chromaticity coordinate area determiner 72 performs determination of the first chromaticity coordinates V1, the second chromaticity coordinates V2, and the third chromaticity coordinates V3 based on the analysis.

Based on a comparison between a conventional FSC system and the FSC system employed in the embodiment, the following describes a mechanism that can inhibit color break, as compared with the conventional FSC system, by determining the first chromaticity coordinates V1, the second chromaticity coordinates V2, and the third chromaticity coordinates V3 in the embodiment.

Figure 6:
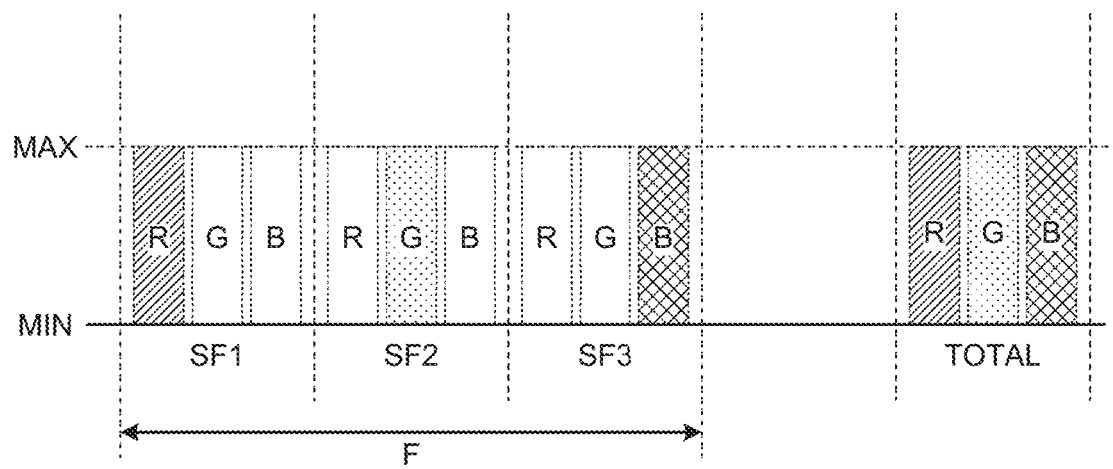
FIG. 6 is a color chart illustrating a color transition in a period including a first subframe period, a second subframe period, and a third subframe period employed in a conventional field sequential color (FSC) system as a comparative example.

FIG. 6 is a color chart illustrating a color transition in a period including the first subframe period SF1, the second subframe period SF2, and the third subframe period SF3 employed in the conventional FSC system as a comparative example. In FIG. 6, and in FIG. 7 and FIG. 8 described later, the highest luminance of the first light source 11R, the second light source 11G, and the third light source 11B is indicated by MAX, whereas the lowest luminance thereof is indicated by MIN. In the comparative example, as illustrated in FIG. 6, in the lighting period Br of the first subframe period SF1, the first light source 11R is lit with the highest luminance, whereas the second light source 11G and the third light source 11B are not lit. In the comparative example, in the lighting period Br of the second subframe period SF2, the second light source 11G is lit with the highest luminance, whereas the first light source 11R and the third light source 11B are not lit. In the comparative example, in the lighting period Br of the third subframe period SF3, the third light source 11B is lit with the highest luminance, whereas the first light source 11R and the second light source 11G are not lit. In the comparative example, in correspondence with such lighting control of the lighting period Br of each of the subframe periods SF, writing of the pixel signal in the writing period Wr of each of the subframe periods SF is performed. That is to say, in the writing period Wr of the first subframe period SF1, the pixel signal corresponding to the R gradation value among the R, G, B gradation values of the pixel data is given to the pixel Pix. In the writing period Wr of the second subframe period SF2, the pixel signal corresponding to the G gradation value among the R, G, B gradation values of the pixel data is given to the pixel Pix. In the writing period Wr of the third subframe period SF3, the pixel signal corresponding to the B gradation value among the R, G, B gradation values of the pixel data is given to the pixel Pix.

In such a comparative example, when a shift from the first subframe period SF1 to the second subframe period SF2 is made, the color output in the display area 7 changes from red (R) to green (G). When a shift from the second subframe period SF2 to the third subframe period SF3 is made, the color output in the display area 7 changes from green (G) to blue (B). When a shift from the third subframe period SF3 to the first subframe period SF1 of the next frame period F is made, the color output in the display area 7 changes from blue (B) to red (R). Thus, in the comparative example, the output color component is completely changed before and after the shift of the subframe period SF. When such a complete change in the color components occurs in the comparative example, a user viewing the display area 7 is more likely to recognize color break. In other words, the prominence of the change in the color components output before and after the shift of the subframe period SF exerts an influence on the prominence of recognition of color break.

Figure 7:
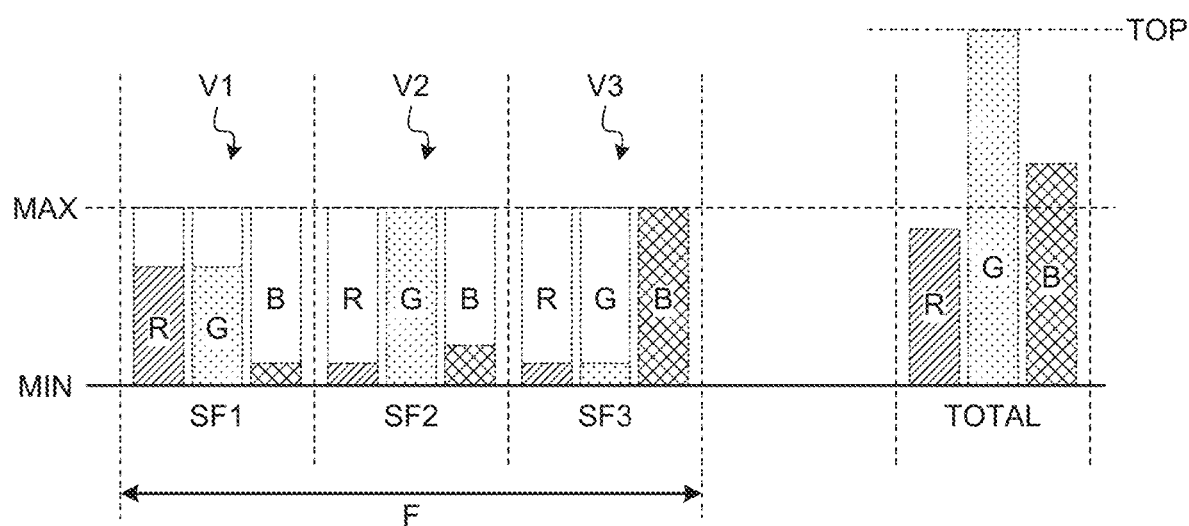
FIG. 7 is a color chart illustrating an example of a color transition in a period including the first subframe period, the second subframe period, and the third subframe period employed in the embodiment.

FIG. 7 is a color chart illustrating an example of a color transition in a period including the first subframe period SF1, the second subframe period SF2, and the third subframe period SF3 employed in the embodiment. In the embodiment, the first chromaticity coordinates V1, the second chromaticity coordinates V2, and the third chromaticity coordinates V3 that can reproduce colors indicated by coordinates included in the area IL are determined. The light source 11 is controlled such that light corresponding to the first chromaticity coordinates V1 is emitted from the light source 11 in the lighting period Br of the first subframe period SF1, light corresponding to the second chromaticity coordinates V2 is emitted from the light source 11 in the lighting period Br of the second subframe period SF2, and light corresponding to the third chromaticity coordinates V3 is emitted from the light source 11 in the lighting period Br of the third subframe period SF3.

FIG. 5 and FIG. 7 exemplify a case in which each of the colors of the light to be emitted from the light source 11 in the first subframe period SF1, the second subframe period SF2, and the third subframe period SF3, that is, each of the colors corresponding to the first chromaticity coordinates V1, the second chromaticity coordinates V2, and the third chromaticity coordinates V3, includes color components of red (R), green (G), and blue (B). In such an example illustrated in FIG. 5 and FIG. 7, the degree of the change in the color components output before and after the shift of the subframe periods SF is smaller than that of the comparative example illustrated in FIG. 6. This can further inhibit recognition of color break by the user viewing the display area 7.

In the embodiment, control of the gradation values indicated by the pixel signal written in the writing period Wr of each of the subframe periods SF is performed based on the R, G, B gradation values indicated by each pixel data. As an example, assume that the R, G, B gradation values indicated by one piece of pixel data among the pieces of pixel data included in the frame image are (R, G, B)=(50, 140, 75). Assume that the first chromaticity coordinates V1 illustrated in FIG. 7 is a color to be reproduced by lighting the first light source 11R at 70% of its highest luminance, lighting the second light source 11G at 70% of its highest luminance, and lighting the third light source 11B at 10% of its highest luminance. Assume that the second chromaticity coordinates V2 illustrated in FIG. 7 is a color to be reproduced by lighting the first light source 11R at 10% of its highest luminance, lighting the second light source 11G at 100% of its highest luminance, and lighting the third light source 11B at 20% of its highest luminance. Assume that the third chromaticity coordinates V3 illustrated in FIG. 7 is a color to be reproduced by lighting the first light source 11R at 10% of its highest luminance, lighting the second light source 11G at 10% of its highest luminance, and lighting the third light source 11B at 100% of its highest luminance. In this case, in the writing period Wr of the first subframe period SF1, the pixel signal corresponding to the gradation values for reflecting 50% of the applied light in the output of the display area 7 is written to the pixel Pix to which the one piece of pixel data is given, whereby output corresponding to the gradation values of (R, G, B)=(35, 35, 5) is performed during the lighting period Br of the first subframe period SF1. In the writing period Wr of the second subframe period SF2, the pixel signal corresponding to the gradation values for reflecting the maximum amount (100%) of the applied light in the output of the display area 7 is written to the pixel Pix to which the one piece of pixel data is given, whereby output corresponding to the gradation values of (R, G, B)=(10, 100, 20) is performed during the lighting period Br of the second subframe period SF2. In the writing period Wr of the third subframe period SF3, the pixel signal corresponding to the gradation values for reflecting 50% of the applied light in the output of the display area 7 is written to the pixel Pix to which the one piece of pixel data is given, whereby output corresponding to the gradation values of (R, G, B)=(5, 5, 50) is performed during the lighting period Br of the third subframe period SF3. With this operation, the output performed by the pixel Pix, to which the one piece of pixel data is given, throughout the first subframe period SF1, the second subframe period SF2, and the third subframe period SF3 included in the frame period F corresponds to gradation values of (R, G, B)=(50, 140, 75). The embodiment is not limited to the example of this one piece of pixel data, and a color indicated by the pixel data corresponding to coordinates included in the area IL can be reproduced by a combination of the light corresponding to the first chromaticity coordinates V1, the second chromaticity coordinates V2, and the third chromaticity coordinates V3 as the three apexes of the chromaticity coordinate area TA including the area IL. To reproduce the color of pixel data not included in the chromaticity coordinate area TA such as the excluded coordinates OL1 and OL2, the color is replaced with an approximate color included in the chromaticity coordinate area TA, and then similar reproduction is performed. The approximate color in this example is a color corresponding to coordinates positioned closest to the excluded coordinates OL1 (or the excluded coordinates OL2) in the chromaticity coordinate area TA, for example. Thus, determination of the gradation values of each of the subframe periods SF corresponding to the light to be emitted from the light source 11 in each of the subframe periods SF in the frame period F and generation of the pixel signal corresponding to the determined gradation values are performed by the image signal generator 73. Generation of the signal for controlling the degree of emission of each of the first light source 11R, the second light source 11G, and the third light source 11B in each of the subframe periods SF in correspondence with each of the first chromaticity coordinates V1, the second chromaticity coordinates V2, and the third chromaticity coordinates V3 is performed by the light source control signal generator 74.

The following describes a phenomenon that can occur if the output in the frame period F in the embodiment is performed only in the first subframe period SF1, the second subframe period SF2, and the third subframe period SF3. In FIG. 6 and FIG. 7, components obtained by simply synthesizing the light that is emitted from the light source 11 during the first subframe period SF1, the light that is emitted from the light source 11 during the second subframe period SF2, and the light that is emitted from the light source 11 during the third subframe period SF3 is illustrated in the column of "Total". That is to say, the column of "Total" indicates the color components of the light that is applied to the display area 7 during the frame period F.

In the comparative example, as indicated by the column of "Total" in FIG. 6, the color components of the light that is applied to the display area 7 during the frame period F are the color components of white (W) obtained by simply synthesizing the highest luminance of R, the highest luminance of G, and the highest luminance of B.

In the embodiment, on the other hand, the color components of the light that is applied to the display area 7 during the frame period F are color components obtained by simply synthesizing the color components of the first chromaticity coordinates V1, the color components of the second chromaticity coordinates V2, and the color components of the third chromaticity coordinates V3. The color components obtained by simply synthesizing the color components of the first chromaticity coordinates V1, the color components of the second chromaticity coordinates V2, and the color components of the third chromaticity coordinates V3 do not necessarily have a ratio for reproducing white (W). The column of "Total" in FIG. 7 indicates an example in which the color component of green (G) is larger than the color component of red (R) and the color component (B), and the color component of blue (B) is larger than the color component of red (R). That is to say, in the example illustrated in FIG. 7, the color components of the light that is applied to the display area 7 during the frame period F are not color components corresponding to white (W).

Most of the light output from the display area 7 to be visually recognized by the user is light emitted from the light source 11 and guided to the display surface of the display area 7 via the pixels Pix to reach the eyes of the user. The light output from the display area 7 to be visually recognized by the user further includes light caused by wiring scattering. The light caused by wiring scattering is light that is reflected by wiring provided within the display area 7 and reaches the eyes of the user. The wiring provided within the display area 7 is, for example, the signal lines 4 and the scan lines 5. The color components of the light caused by wiring scattering occurring during each of the frame periods F correspond to the color components of the light that is applied to the display area 7 during the frame period F. Thus, in the example illustrated in FIG. 7, as indicated in the column of "Total" in FIG. 7, the color components of the light caused by wiring scattering, in which the color component of green (G) is larger than the color component of red (R) and the color component of blue (B), are not the color components corresponding to white (W).

The color of the frame image displayed during the frame period F is influenced by the color components of the light caused by wiring scattering. Consequently, in the example illustrated in FIG. 7, owing to the influence of the light by wiring scattering, the frame image output in the display area 7 is unintentionally visually recognized as a green (G)-like color close to blue (B) as a whole by the user. Thus, in the embodiment, when color reproduction during the frame period F is completed with the light in the colors corresponding to the first chromaticity coordinates V1, the second chromaticity coordinates V2, and the third chromaticity coordinates V3 assigned only to the first subframe period SF1, the second subframe period SF2, and the third subframe period SF3, a phenomenon related to color reproducibility may occur by the influence of the light caused by wiring scattering. In the following, when we simply describes a phenomenon related to color reproducibility, the phenomenon refers to the phenomenon related to color reproducibility by the influence of the light by wiring scattering described above.

For the purpose of achieving further improvement, the embodiment copes with the phenomenon related to color reproducibility. Specifically, in the embodiment, in addition to the first subframe period SF1, the second subframe period SF2, and the third subframe period SF3, the adjusting subframe period Ad is included in the frame period F. The adjusting subframe period Ad is a period for outputting a differential color DC. The differential color DC is a complementary color of a "mixed color of the color corresponding to the first chromaticity coordinates V1, the color corresponding to the second chromaticity coordinates V2, and the color corresponding to the third chromaticity coordinates V3". The complementary color in this example refers to a color that can make white (W) as an achromatic color by being mixed with a chromatic color to be mixed therewith. That is to say, the differential color DC is a color that can reproduce white (W) by being mixed with the "mixed color of the color corresponding to the first chromaticity coordinates V1, the color corresponding to the second chromaticity coordinates V2, and the color corresponding to the third chromaticity coordinates V3", where the mixed color is the chromatic color to be mixed with the differential color DC.

Figure 8:
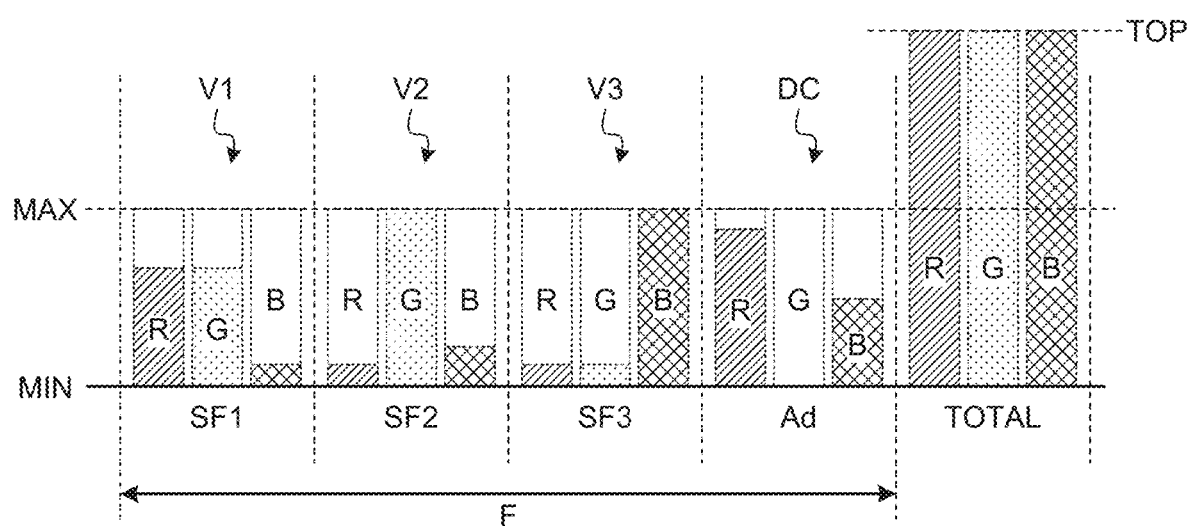
FIG. 8 is a color chart illustrating a differential color in an adjusting subframe period corresponding to a color transition in a period including the first subframe period, the second subframe period, and the third subframe period similar to that in FIG. 7.

FIG. 8 is a color chart illustrating the differential color DC in the adjusting subframe period Ad corresponding to a color transition in a period including the first subframe period SF1, the second subframe period SF2, and the third subframe period SF3 similar to that in FIG. 7. FIG. 8 exemplifies a case in which the color to be reproduced by lighting the first light source 11R at 90% of the highest luminance, not lighting the second light source 11G (0%), and lighting the third light source 11B at 50% of the highest luminance is the differential color DC. Thus, the color components of the light that is applied to the display area 7 during the frame period F including the first subframe period SF1, the second subframe period SF2, the third subframe period SF3, and the adjusting subframe period Ad are color components corresponding to 180% of the highest luminance in common for red (R), green (G), and blue (B) as indicated in the column of "Total" in FIG. 8. In FIG. 7 and FIG. 8, a symbol TOP is illustrated at a position of the height of the graph corresponding to 180% of the highest luminance in the column of "Total". That is to say, in the example illustrated in FIG. 8, light in red (R), light in green (G), and light in blue (B) that are applied to the display area 7 during the frame period F reproduce white (W) by additive color mixing. Thus, the color components of the light caused by wiring scattering can be made into the color components that correspond to white (W). Consequently, in the embodiment, even when the light in the colors corresponding to the first chromaticity coordinates V1, the second chromaticity coordinates V2, and the third chromaticity coordinates V3 is assigned to the first subframe period SF1, the second subframe period SF2, and the third subframe period SF3, it is possible, by assigning the differential color DC to the adjusting subframe period Ad, to inhibit the phenomenon related to color reproducibility from occurring. Thus, according to the embodiment, both inhibition of the occurrence of color break and more accurate color reproduction of the frame image can be achieved. When the period length of the adjusting subframe period Ad is the same as the period length of one subframe period, the gradation of each of the pixels Pix is preferably made to be zero.

In the embodiment, the image signal generator 73 performs generation of the differential color DC. However, this is only by way of example, and the embodiment is not limited thereto and can be changed as appropriate. The chromaticity coordinate area determiner 72 may perform generation of the differential color DC, or another component that is different from the chromaticity coordinate area determiner 72 and from the image signal generator 73 and has a dedicated function to generate the differential color DC may further be provided within the image processing circuit 70, for example.

The image signal generator 73 performs processing to generate pixel signals for reproducing output corresponding to the R, G, B gradation values using the light corresponding to the first chromaticity coordinates V1, the second chromaticity coordinates V2, and the third chromaticity coordinates V3 applied in the first subframe period SF1, the second subframe period SF2, and the third subframe period SF3, respectively. The processing to generate the pixel signals is performed based on the first chromaticity coordinates V1, the second chromaticity coordinates V2, and the third chromaticity coordinates V3 determined by the chromaticity coordinate area determiner 72 and the R, G, B gradation values indicated by the pixel data included in the frame image. The processing to generate the pixel signals is performed individually for each of the pieces of pixel data included in the frame image. Specifically, as in the example of the one piece of pixel data described above, the image signal generator 73 generates the pixel signals to be individually written in the pixels Pix in each of the writing period Wr of the first subframe period SF1, the writing period Wr of the second subframe period SF2, and the writing period Wr of the third subframe period SF3, for each pixel data. Furthermore, the image signal generator 73 generates a pixel signal written in the writing period AWr of the adjusting subframe period Ad. Each of the gradation values corresponding to the pixel signals to be written in the writing period AWr of the adjusting subframe period Ad is a predetermined gradation value. The predetermined gradation value may be the highest gradation value ($2^j-1$) or a gradation value varying depending on partial areas A1, A2, . . . , A5, which will be described with reference to FIG. 11 described later, for example.

The image processing circuit 70 of the embodiment outputs various kinds of pixel signals generated by the image signal generator 73 to the signal output circuit 8 with timing corresponding to the writing period Wr of each of the subframe periods SF or the writing period AWr of the adjusting subframe period Ad during the frame period F (refer to FIG. 3), for example. The image processing circuit 70 outputs a signal for synchronization control to the timing controller 13 in sync with the timing with which the pixel signals generated by the image signal generator 73 are output to the signal output circuit 8. During the writing period Wr of each of the subframe periods SF, the timing controller 13 causes the scan circuit 9 to output the drive signal to the scan lines 5 line by line in accordance with the signal for synchronization control and causes the signal output circuit 8 to output the pixel signals received by the signal output circuit 8 so as to write the pixel signals to the pixels Pix. During the writing period AWr of the adjusting subframe period Ad, the timing controller 13 causes the scan circuit 9 to output the drive signal to all the scan lines 5 at the same time and causes the signal output circuit 8 to output the pixel signal received by the signal output circuit 8 so as to write the pixel signal to each of the pixels Pix.

The light source control signal generator 74 generates a control signal such that the colors to be reproduced by the light applied from the light source 11 during the lighting period Br correspond to the first chromaticity coordinates V1, the second chromaticity coordinates V2, and the third chromaticity coordinates V3 determined by the chromaticity coordinate area determiner 72 and to the differential color DC. The control signal is a signal indicating the emission intensity of each of the first light source 11R, the second light source 11G, and the third light source 11B.

The image processing circuit 70 of the embodiment outputs, to the timing controller 13, the control signal generated by the light source control signal generator 74 together with the signal for synchronization control, with timing depending on the lighting period Br of each of the subframe periods SF or the adjusting subframe period Ad during the frame period F (refer to FIG. 3), for example. The timing controller 13 transmits the control signal to the light source drive circuit 12. The light source drive circuit 12 lights the first light source 11R, the second light source 11G, and the third light source 11B with emission intensities corresponding to the control signal during the lighting period Br under the control of the timing controller 13. Thus, light in a color corresponding to the first chromaticity coordinates V1 is emitted in the lighting period Br of the first subframe period SF1, light in a color corresponding to the second chromaticity coordinates V2 is emitted in the lighting period Br of the second subframe period SF2, light in a color corresponding to the third chromaticity coordinates V3 is emitted in the lighting period Br of the third subframe period SF3, and light in a color corresponding to the differential color DC is emitted in the lighting period Br subsequent to the writing period AWr of the adjusting subframe period Ad.

The period length (time) of the first subframe period SF1, the period length (time) of the second subframe period SF2, and the period length (time) of the third subframe period SF3 are the same. The period lengths (time) of the writing periods Wr of the subframe periods SF are also equalized, and the period lengths (time) of the lighting periods Br of the subframe periods SF are also equalized. The period length (time) of the adjusting subframe period Ad may be the same as or different from the period length (time) of each of the subframe periods SF. The writing period AWr of the adjusting subframe period Ad is collective writing for all the lines and can thus be a shorter period length (time) than the period length (time) of the writing period Wr of each of the subframe periods SF. The lighting period Br of the adjusting subframe period Ad can also be a shorter period length (time) than the period length (time) of the lighting period Br of each of the subframe periods SF. The gradation of each of the pixels Pix in the adjusting subframe period Ad may be made larger than zero to cause not only the scattering by wiring but also scattering by the liquid crystal 3 on purpose, whereby the time length of the adjusting subframe period Ad may be reduced in accordance with the gradation (as the gradation is increased).

For example, assume that the emission intensity of each of the first light source 11R, the second light source 11G, and the third light source 11B corresponding to the first light chromaticity coordinates RV, the second light chromaticity coordinates GV, and the third light chromaticity coordinates BV (refer to FIG. 4) is preset to an emission intensity ($\beta$) lower than the potential highest emission intensity ($\alpha$) allowed by an element of a corresponding one of the first light source 11R, the second light source 11G, and the third light source 11B. In this case, in each of the subframe periods SF, light is emitted by a corresponding one of the first light source 11R, the second light source 11G, and the third light source 11B with an emission intensity controlled to be the emission intensity ($\beta$) or less. On the other hand, assume that light corresponding to the differential color DC is emitted in the adjusting subframe period Ad by the control of the first light source 11R, the second light source 11G, and the third light source 11B in which the highest emission intensity ($\alpha$) is allowed. In this case, lighting with the highest emission intensity ($\alpha$) is performed when the primary color (red (R), green (G), or blue (B)) corresponding to the largest color component among the color components included in the differential color DC is a color component corresponding to a 100% gradation value, whereby the lighting period Br of the adjusting subframe period Ad can be reduced compared with a case controlled to be the emission intensity ($\beta$) or less also during the lighting period Br of the adjusting subframe period Ad. This is because the color component amount of light can be understood to be multiplication of the emission intensity and the emission time. Consequently, in reproducing a color corresponding to certain color components, if brighter light is emitted, the emission time of the light can be reduced by the brightness. In this example, the period length (time) of the lighting period Br of the adjusting subframe period Ad can be $\alpha/\beta$, of the period length (time) of the lighting period Br of each of the subframe periods SF. In the case where the emission intensity is controlled to be the emission intensity ($\beta$) or less also during the lighting period Br of the adjusting subframe period Ad, the period length (time) of the lighting period Br of the adjusting subframe period Ad is the same as the period length (time) of the lighting period Br of each of the subframe periods SF. Thus, the time length of the adjusting subframe period Ad depends on the brightness of the light to be emitted from the light source 11. The brightness in this example refers to the brightness of light given to the entire display area 7 by the light that is emitted from the light source 11 so as to illuminate the entire display area 7.

As described above, according to the embodiment, the display device 100 includes the display panel P and the light source device L. The display panel P includes the liquid crystal 3, which is enclosed between the two substrates facing each other (the first substrate 30 and the second substrate 20), and the two electrodes (the pixel electrode 2 and the common electrode 6) to which a potential difference for controlling the orientation of the liquid crystal 3 is given.

The display panel P is provided with the pixels Pix. The light source device L emits light to the display panel P. The light source device L includes the first light source 11R emitting light in the first color, the second light source 11G emitting light in the second color, and the third light source 11B emitting light in the third color. The display period of the frame image (the frame period F) includes the three subframe periods SF and the adjusting subframe period Ad for adjusting the color reproduced in the three subframe periods SF. The three subframe periods SF include the first subframe period SF1, the second subframe period SF2, and the third subframe period SF3. The light source device L emits light for reproducing the color corresponding to the first chromaticity coordinates V1 in the chromaticity coordinate area TA in the first subframe period SF1, emits light for reproducing the color corresponding to the second chromaticity coordinates V2 in the chromaticity coordinate area TA in the second subframe period SF2, emits light for reproducing the color corresponding to the third chromaticity coordinates V3 in the chromaticity coordinate area TA in the third subframe period SF3, and emits light for reproducing the differential color DC in the adjusting subframe period Ad. The chromaticity coordinate area TA is a triangular chromaticity coordinate area with the first chromaticity coordinates V1, the second chromaticity coordinates V2, and the third chromaticity coordinates V3 as apexes and includes the chromaticity coordinates of the pixel data (the coordinates included in the area IL, for example) obtained by excluding partial pixel data having a relatively low gradation value (the excluded coordinates OL1 and OL2, for example) from the pieces of pixel data included in the frame image data I. The chromaticity coordinate area TA is part of the color gamut TRGB with the first light chromaticity coordinates RV, the second light chromaticity coordinates GV, and the third light chromaticity coordinates BV as apexes. The partial pixel data (the excluded coordinates OL1 and OL2, for example) is 5% or less of the pieces of pixel data included in the frame image data I. The differential color DC is a complementary color of a mixed color of the color corresponding to the first chromaticity coordinates V1, the color corresponding to the second chromaticity coordinates V2, and the color corresponding to the third chromaticity coordinates V3.

Thus, the color difference before and after the switching of the subframe periods SF can be contained in the color difference between the first chromaticity coordinates V1, the second chromaticity coordinates V2, and the third chromaticity coordinates V3. Consequently, color break can be more inhibited in the embodiment compared with in a case where color break that would occur in switching the color from any one of the color corresponding to the first light chromaticity coordinates RV, the color corresponding to the second light chromaticity coordinates GV, and the color corresponding to the third light chromaticity coordinates BV to another thereof. The differential color DC is output in the adjusting subframe period Ad, whereby both inhibition of the occurrence of color break and more accurate color reproduction of the frame image can be achieved.

The light source device L emits the light from the lateral side of the display panel P. Thus, color break can further be inhibited in what is called a side light type display device.

The first color is Red (R), the second color is green (G), and the third color is blue (B). Thus, color break can further be inhibited in a display device employing the light source 11 configured to emit what is called RGB light.

The display panel P is a display panel in which the polymer-dispersed type liquid crystal (the liquid crystal 3, for example) is enclosed between the two substrates facing each other (the second substrate 20 and the first substrate 30, for example). Thus, color break can further be inhibited in a display device of the FSC system using the polymer-dispersed type liquid crystal.

The adjusting subframe period Ad is a period after the first subframe period SF1, the second subframe period SF2, and the third subframe period SF3 in the frame period F. Thus, more accurate color reproduction of the frame image can be performed with a fewer number of the writing periods AWr and a fewer number of the lighting periods Br.

In the adjusting subframe period Ad, the pixel signal corresponding to the differential color DC is written to the pixels Pix collectively. Thus, more accurate color reproduction of the frame image can be performed in the writing period AWr shorter in time.

Modifications

Figure 9:
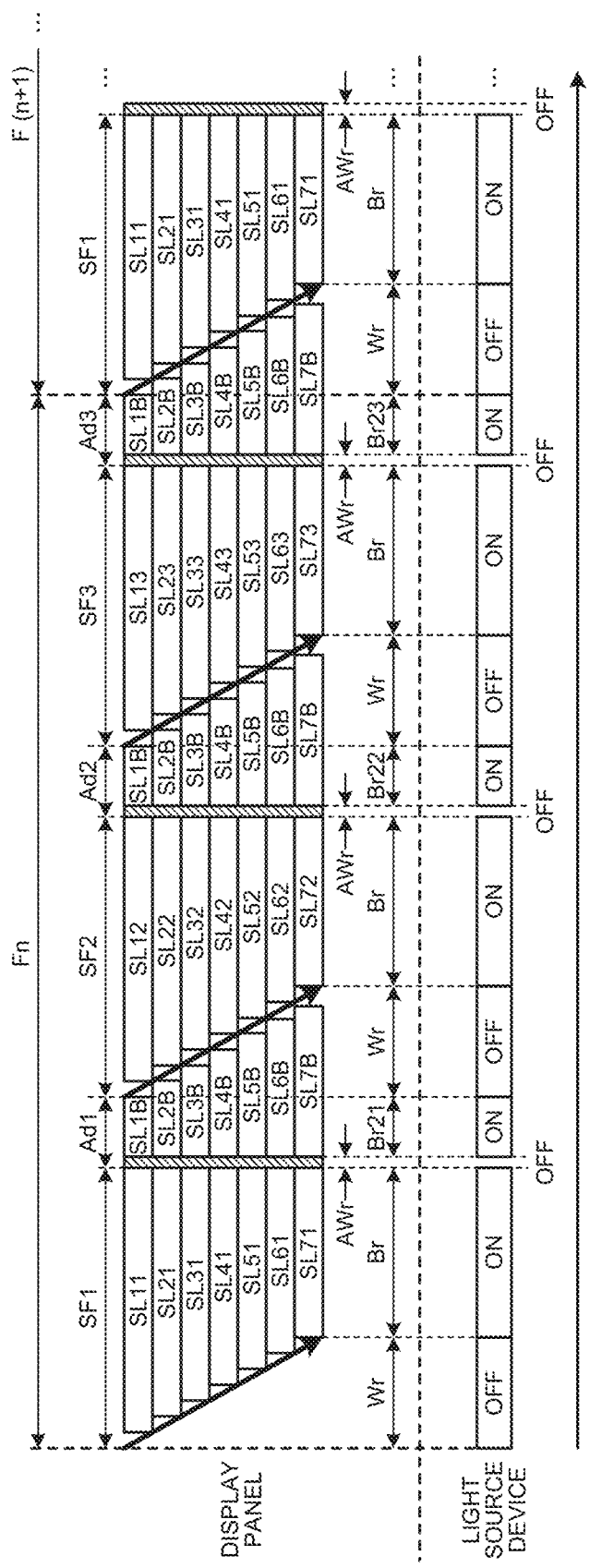
FIG. 9 is a time chart illustrating an example of control used in the display device in a modification.
Figure 10:
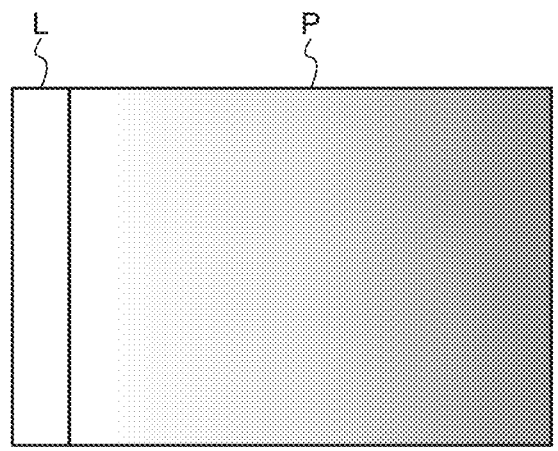
FIG. 10 is a schematic diagram illustrating an example of the luminance distribution of the display panel formed by a positional relation between a light source device and the display panel.
Figure 11:
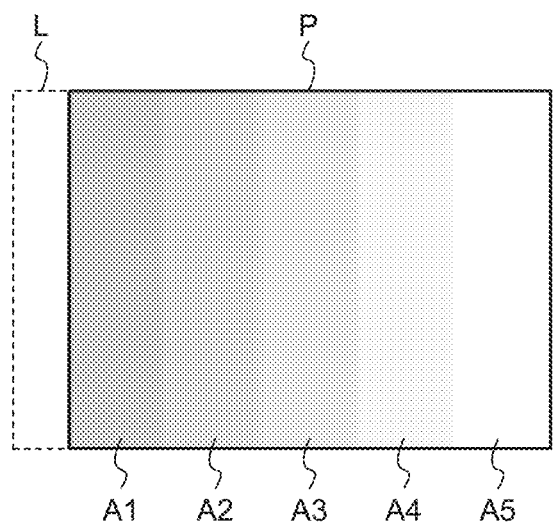
FIG. 11 is a schematic diagram illustrating an example of gradation value control performed in a second modification in consideration of the positional relation between the light source device and the display panel.

The following describes modifications of the embodiment with reference to FIG. 9 to FIG. 11. In the description of the modifications, components similar to those of the embodiment are denoted by the same reference sings, and a description thereof may be omitted.

(First Modification)

FIG. 9 is a time chart illustrating an example of control used in the display device 100 in the modification. In the embodiment, as illustrated in FIG. 3, the adjusting subframe period Ad is provided in a period after the first subframe period SF1, the second subframe period SF2, and the third subframe period SF3 in the frame period F; whereas, in the first modification, an adjusting subframe period is provided in each of a period after the first subframe period SF1 and before the second subframe period SF2, a period after the second subframe period SF2 and before the third subframe period SF3, and a period after the third subframe period SF3 in the frame period F. Specifically, the adjusting subframe periods in the modification includes an adjusting subframe period Ad1, an adjusting subframe period Ad2, and an adjusting subframe period Ad3 illustrated in FIG. 9. The adjusting subframe period Ad1 is an adjusting subframe period after the first subframe period SF1 and before the second subframe period SF2 in the frame period F. The adjusting subframe period Ad2 is an adjusting subframe period after the second subframe period SF2 and before the third subframe period SF3 in the frame period F. The adjusting subframe period Ad3 is an adjusting subframe period after the third subframe period SF3 in the frame period F.

Each of the adjusting subframe period Ad1, the adjusting subframe period Ad2, and the adjusting subframe period Ad3 includes the writing period AWr like the adjusting subframe period Ad of the embodiment. The writing period AWr of each of the adjusting subframe period Ad1, the adjusting subframe period Ad2, and the adjusting subframe period Ad3 is a writing period in which a predetermined gradation value is written to all the lines collectively as in the writing period AWr of the adjusting subframe period Ad of the embodiment. The writing period AWr of the adjusting subframe period Ad1 is subsequent to the lighting period Br of the first subframe period SF1. The writing period AWr of the adjusting subframe period Ad2 is subsequent to the lighting period Br of the second subframe period SF2. The writing period AWr of the adjusting subframe period Ad3 is subsequent to the lighting period Br of the third subframe period SF3.

The adjusting subframe period Ad1 includes a lighting period Br21 subsequent to the writing period AWr. The adjusting subframe period Ad2 includes a lighting period Br22 subsequent to the writing period AWr. The adjusting subframe period Ad3 includes a lighting period Br23 subsequent to the writing period AWr. In the lighting periods Br21, Br22, and Br23, light in a color corresponding to the differential color DC is emitted as in the lighting period Br of the adjusting subframe period Ad of the embodiment.

A time obtained by adding the period length (time) of the lighting period Br21, the period length (time) of the lighting period Br22, and the period length (time) of the lighting period Br23 together corresponds to the period length (time) of the lighting period Br of the embodiment. Although it is desirable that the period length (time) of the lighting period Br21, the period length (time) of the lighting period Br22, and the period length (time) of the lighting period Br23 be equal, some or all of them may be different from each other.

Although the pixel signals to be written in the writing period AWr of each of the adjusting subframe periods Ad1, Ad2, and Ad3 are written to all the lines collectively, writing of the pixel signals during the writing period Wr of the subframe period SF subsequent to the writing period AWr proceeds line by line. Thus, FIG. 9 illustrates the pixel signals written in the writing period AWr as line images SL1B, SL2B, SL3B, SL4B, SL5B, SL6B, and SL7B line by line. FIG. 9 illustrates that the differences between the remaining periods for the line images SL1B, SL2B, SL3B, SL4B, SL5B, SL6B, and SL7B depend on the differences between the writing timings of the line images to be written during the writing period Wr of the subframe period SF subsequent to each writing period AWr.

(Second Modification)

FIG. 10 is a schematic diagram illustrating an example of the luminance distribution of the display panel P formed by a positional relation between the light source device L and the display panel P. As illustrated in FIG. 2, the light source device L emits the light from the lateral side of the display panel P. Thus, as illustrated in FIG. 10, the display panel P illuminated with the light from the light source device L may exhibits luminance distribution in which a side thereof relatively close to the light source device L is relatively bright, whereas a side relatively far from the light source device L is relatively dark. Thus, when there is no correction, non-uniformity in brightness may occur in the display area 7 of the display panel P by the light from the light source device L that emits the light from the lateral side of the display panel P.

FIG. 11 is a schematic diagram illustrating an example of gradation value control performed in a second modification in consideration of the positional relation between the light source device L and the display panel P. As illustrated in FIG. 11, in the second modification, the display region of the frame image included in the display area 7 of the display panel P is divided into the partial areas A1, A2, . . . , A5. The image signal generator 73 of the second modification sets the pixel signal for the partial area A1 relatively close to the light source device L to be a pixel signal having a relatively low gradation degree. The image signal generator 73 of the second modification sets the pixel signal for the partial area A5 relatively far from the light source device L to be a pixel signal having a relatively high gradation degree. Thus, in the partial area A1, although the luminance of the light applied from the light source device L onto the display panel P is relatively high, the degree of scattering of the light guided to the display surface by the pixels Pix is relatively low. In the partial area A5, although the luminance of the light applied from the light source device L onto the display panel P is relatively low, the degree of scattering of the light guided to the display surface by the pixels Pix is relatively high. Thus, the degree of scattering of the light by the pixels Pix included in the partial area A1 and the degree of scattering of the light by the pixels Pix included in the partial area A5 are made different from each other, whereby the apparent brightness of the partial area A1 and the apparent brightness of the partial area A5 can be made closer.

By applying the same way as that for the relation between the partial area A1 and the partial area A5 described above, the image signal generator 73 of the second modification sets the pixel signal for the partial area A3, which is located between the partial area A1 and the partial area A5 with respect to the light source device L, to be a pixel signal having a higher gradation degree than that of the partial area A1 and having a lower gradation degree than that of the partial area A5. The image signal generator 73 of the second modification sets the pixel signal for the partial area A2, which is located between the partial area A1 and the partial area A3 with respect to the light source device L, to be a pixel signal having a higher gradation degree than that of the partial area A1 and having a lower gradation degree than that of the partial area A3. The image signal generator 73 of the second modification sets the pixel signal for the partial area A4, which is located between the partial area A3 and the partial area A5 with respect to the light source device L, to be a pixel signal having a higher gradation degree than that of the partial area A3 and having a lower gradation degree than that of the partial area A5.

Although the number of the divided partial areas A1, A2, . . . , A5 located at different positions with respect to the light source device L is five in FIG. 11, the number of the divided partial areas is only required to be plural and may be four or less or six or more. A relative gradation-degree relation between the partial areas A1, A2, . . . , A5 can be set based on the luminance distribution of the light applied from the light source device L onto the display panel P, which has been determined by measurement or the like performed in advance (refer to FIG. 10).

The image signal generator 73 of the second modification gives the relative gradation-degree relation between the partial areas A1, A2, . . . , A5 to the pixel signals. For this operation, a first method may be employed in which the relative gradation-degree relation is given to the pixel signals to be written in the writing period AWr and not to the pixel signals to be written in the writing period Wr, or a second method may be employed in which the relative gradation-degree relation is given to both the pixel signals to be written in the writing period Wr and the pixel signals to be written in the writing period AWr. When the first method is employed, in the adjusting subframe period Ad of the embodiment (the adjusting subframe periods Ad1, Ad2, and Ad3 of the first modification), the gradation value of the pixel signal to be written to the pixel Pix located relatively far from the light source device L is higher than the gradation value of the pixel signal to be written to the pixel Pix located relatively close to the light source device L. When the first method is employed, the algorithm for determination of the gradation value of the pixel signal by the image signal generator 73 can further be simplified. When the second method is employed, the uniformity of the apparent brightness of the entire display panel P and the accuracy of color reproducibility when the frame image is displayed can further be increased.

In consideration of the relation between an extending direction of the signal lines 4 and an extending direction of the scan lines 5 and the positional relation between the display panel P and the light source device L illustrated in FIG. 1, an arrangement direction of the partial areas A1, A2, . . . , A5 is an arrangement direction of the scan lines 5.

Consequently, when the first method of the second modification is used in the example illustrated in FIG. 1, the pixel signals to be given to the signal lines 4 can be unified with timing when the pixel signal is given to one line, but the timing for giving the pixel signals is required to be made different for each of the partial areas A1, A2, . . . , A5. Given this, the relation between the extending direction of the signal lines 4 and the extending direction of the scan lines 5 illustrated in FIG. 1 is reversed, whereby the arrangement direction of the partial areas A1, A2, . . . , A5 becomes the arrangement direction of the signal lines 4. Thus, when the first system of the second modification is used, the drive signal is simultaneously given to all the lines, and thus all the pixels Pix can collectively be updated while making the pixel signals different for each of the positions of the partial areas A1, A2, . . . , A5.

Either the first modification or the second modification may be applied to the embodiment, or both of them may be applied to the embodiment.

Although in the embodiment described above the liquid crystal 3 is a polymer-dispersed type liquid crystal, and the display panel P of what is called a polymer-dispersed liquid crystal (PDLC) type is employed, the display panel P is not limited to this example. The display panel P may be a reflective, transmissive, or transflective liquid crystal display panel.

The light source device L is not limited to what is called the side light, which is positioned on the lateral side of the display panel P, and may be any device that emits light from a position at which the scattering of light can be controlled by the pixels Pix, such as a front light.

The combination of the colors of the light of the first light source 11R, the second light source 11G, and the third light source 11B is not limited to a combination of red (R), green (G), and blue (B). It may be a combination of other colors such as cyan (C), magenta (M), and yellow (Y).

The relation between the area IL, the excluded coordinates OL1 and OL2, and the chromaticity coordinate area TA, the positional relation of the area IL and the chromaticity coordinate area TA with respect to the color gamut TRGB, and the positional relation of the color gamut TRGB with respect to the color space CS described with reference to FIG. 5, are each only by way of example, and the present disclosure is not limited to these examples. The area IL and the chromaticity coordinate area TA depend on the frame image data I. The color space that can be employed in the embodiment and the modifications (hereinafter, the embodiment and the like) is not limited to the color space defined by CIE1931, and various color spaces that can be employed for the output control of the frame image can be employed.

It is understood that other effects brought about by the aspects described in the embodiment and the like, which are obvious from the description of the present specification or can be thought of as appropriate by those skilled in the art, are naturally brought about by the present disclosure.

What is claimed is:

1. A display device comprising:
a display panel including two substrates facing each other with a liquid crystal enclosed therebetween and two electrodes to which a potential difference controlling orientation of the liquid crystal is given, the display panel being provided with a plurality of pixels; and
a light source device configured to emit light to the display panel, wherein
the light source device includes a first light source configured to emit light in a first color, a second light source configured to emit light in a second color, and a third light source configured to emit light in a third color,
a display period of a frame image includes three subframe periods and an adjusting subframe period for adjusting a color reproduced in the three subframe periods,
the three subframe periods includes a first subframe period, a second subframe period, and a third subframe period,
the light source device is configured to emit light for reproducing a color corresponding to first chromaticity coordinates in the first subframe period, emit light for reproducing a color corresponding to second chromaticity coordinates in the second subframe period, emit light for reproducing a color corresponding to third chromaticity coordinates in the third subframe period, and emit light for reproducing a differential color in the adjusting subframe period,
a triangular chromaticity coordinate area with the first chromaticity coordinates, the second chromaticity coordinates, and the third chromaticity coordinates as apexes includes chromaticity coordinates of pixel data obtained by excluding partial pixel data having a relatively low gradation value from a plurality of pieces of pixel data included in frame image data,
the triangular chromaticity coordinate area is part of a color gamut with chromaticity coordinates of the first color, chromaticity coordinates of the second color, and chromaticity coordinates of the third color as apexes, and
the differential color is a complementary color of a mixed color of the color corresponding to the first chromaticity coordinates, the color corresponding to the second chromaticity coordinates, and the color corresponding to the third chromaticity coordinates,
wherein when color components of the light that is applied to a display area during a frame period including the first subframe period, the second subframe period, the third subframe period, and the adjusting subframe period are the color components corresponding to 180% of a highest luminance in common for the first color, the second color, and the third color, the light in the first color, the light in the second color, and the light in the third color that are applied to the display area during the frame period reproduce white by additive color mixing.

2. The display device according to claim 1, wherein the light source device configured to emit light from a lateral side of the display device.

3. The display device according to claim 1, wherein
the first color is red,
the second color is green, and
the third color is blue.

4. The display device according to claim 1, wherein the liquid crystal is a polymer-dispersed type liquid crystal.

5. The display device according to claim 1, wherein the adjusting subframe period is a period after the first subframe, the second subframe, and the third subframe in the display period of the frame image.

6. The display device according to claim 1, wherein the adjusting subframe period is provided in a period after the first subframe period and before the second subframe period, a period after the second subframe period and before the third subframe period, and a period after the third subframe period, in the display period of the frame image.

7. The display device according to claim 1, wherein a time length of the adjusting subframe period depends on brightness of the light to be emitted from the light source device.

8. The display device according to claim 1, wherein in the adjusting subframe period, a pixel signal corresponding to the differential color is written to the pixels collectively.

9. The display device according to claim 1, wherein
the light source device is configured to emit the light from a lateral side of the display panel, and
in the adjusting subframe period, a gradation value of a pixel signal to be written to a pixel located relatively far from the light source device is higher than a gradation value of a pixel signal to be written to a pixel located relatively close to the light source device.

10. The display device according to claim 1, wherein the partial pixel data is 5% or less of the pieces of pixel data included in the frame image data.

11. A display device comprising:
a display panel including two substrates facing each other with a liquid crystal enclosed therebetween and two electrodes to which a potential difference controlling orientation of the liquid crystal is given, the display panel being provided with a plurality of pixels; and
a light source device configured to emit light to the display panel, wherein
the light source device includes a first light source configured to emit light in a first color, a second light source configured to emit light in a second color, and a third light source configured to emit light in a third color,
a display period of a frame image includes three subframe periods and an adjusting subframe period for adjusting a color reproduced in the three subframe periods,
the three subframe periods includes a first subframe period, a second subframe period, and a third subframe period,
the light source device is configured to emit light for reproducing a color corresponding to first chromaticity coordinates in the first subframe period, emit light for reproducing a color corresponding to second chromaticity coordinates in the second subframe period, emit light for reproducing a color corresponding to third chromaticity coordinates in the third subframe period, and emit light for reproducing a differential color in the adjusting subframe period,
a triangular chromaticity coordinate area with the first chromaticity coordinates, the second chromaticity coordinates, and the third chromaticity coordinates as apexes includes chromaticity coordinates of pixel data obtained by excluding partial pixel data having a relatively low gradation value from a plurality of pieces of pixel data included in frame image data,
the triangular chromaticity coordinate area is part of a color gamut with chromaticity coordinates of the first color, chromaticity coordinates of the second color, and chromaticity coordinates of the third color as apexes, and
the differential color is a complementary color of a mixed color of the color corresponding to the first chromaticity coordinates, the color corresponding to the second chromaticity coordinates, and the color corresponding to the third chromaticity coordinates,
wherein when color components of the light that is applied to a display area during a frame period including the first subframe period, the second subframe period, the third subframe period, and the adjusting subframe period are the color components corresponding to a luminance higher than a highest luminance in common for the first color, the second color, and the third color, the light in the first color, the light in the second color, and the light in the third color that are applied to the display area during the frame period reproduce white by additive color mixing.

* * * * *